United States Patent [19]

Smith et al.

[11] 4,011,443
[45] Mar. 8, 1977

[54] MOTORCYCLE INDICATING SAFETY LIGHT ASSEMBLY

[76] Inventors: Merle F. Smith, 443 W. Main St., Dallastown, Pa. 17313; Harold H. Wagman, 370 Lakeview Drive, York, Pa. 17402

[22] Filed: Apr. 7, 1975

[21] Appl. No.: 565,775

Related U.S. Application Data

[63] Continuation-in-part of Ser. No. 506,397, Sept. 16, 1974, abandoned.

[52] U.S. Cl. .............................. 240/7.55; 240/58; 340/134
[51] Int. Cl.² .............................................. B62J 5/00
[58] Field of Search ................ 240/7.1, 7.5, 7.55, 240/8.1 A, 58; 340/134

[56] References Cited

UNITED STATES PATENTS

| | | | |
|---|---|---|---|
| 2,260,253 | 10/1941 | Johnson | 240/8.1 A |
| 3,135,468 | 6/1964 | Osburn | 240/2 B |
| 3,344,264 | 9/1967 | Perkins | 240/7.5 |
| 3,435,412 | 3/1969 | Bohrer | 340/107 |
| 3,523,290 | 8/1970 | Elledge | 240/2 |
| 3,696,334 | 10/1972 | Demeter | 340/134 |
| 3,862,410 | 1/1975 | Maxwell | 240/58 |
| 3,916,377 | 10/1975 | Demeter | 340/134 X |

FOREIGN PATENTS OR APPLICATIONS

| | | | |
|---|---|---|---|
| 730,862 | 10/1932 | France | 240/7.55 |
| 1,111,657 | 3/1956 | France | 340/134 |

*Primary Examiner*—L. T. Hix
*Assistant Examiner*—A. A. Mathews
*Attorney, Agent, or Firm*—C. Hercus Just; Samuel M. Learned, Jr.

[57] ABSTRACT

An indicating safety light assembly for attachment to motorcycles and the like, being comprised of a safety light sub-assembly which has as components thereof distinctively shaped amber and red colored illumination transmitting cover members respectively affixed to either a segmentalized or a unimodular mounting bracket member in a back-to-back spaced or abutted complementary configuration, which safety light sub-assembly is either bolted to or threadably connected to the upper end of a vertically extending tubular mounting member which at the lower end thereof, is fixedly attached by means of a mounting clamp assembly to a frame member rearward of the seat of a motorcycle or the like so that the amber colored illumination transmitting cover member of the safety light sub-assembly faces forward and the red colored illumination transmitting cover member of the safety light sub-assembly faces rearward of the motorcycle or the like.

7 Claims, 10 Drawing Figures

MOTORCYCLE INDICATING SAFETY LIGHT ASSEMBLY

BACKGROUND OF THE INVENTION

This application is a continuation-in-part of Ser. No. 506,397, filed Sept. 16, 1974, and now abandoned.

The subject of the instant invention relates generally to vehicle safety lights and the like, but more particularly however to a safety light indicating assembly designed for use on a motorcycle, but only for safety purposes, but also to enable oncoming or overtaking motorists from the front or rear of a motorcycle to identify, by visual recognition of said indicating light assembly, that a motorcyclist is being approached.

With the advent of a recent popularity in the use of motorcycles, an ever increasing number of such vehicles are found present on the nation's roads, streets, and highways. However, the increase in vehicular accidents between operators of motorcycles and operators of larger vehicles, such as automobiles and trucks, has also increased considerably, and alarmingly at a rate in excess of the ratio of the increase in use of motorcycles. The primary reason given for, and the apparent cause of, the inordinant discrepancy between the increased use and accident ratio factors for operators of motorcycles with operators of larger vehicles seems to be that operators of the larger vehicles fail to see or recognize a motorcyclist, and consequently, this results in an increased accident rate ratio between motorcycles and larger vehicles such as is presently prevalent.

Various means have been devised to make smaller vehicles more visible to operators of larger vehicles, one of which is the use of a triangular shaped warning flag attached to an elevated flexible staff member affixed to a bicycle, the theory being that "A bicyclist should be seen and not hurt." The theory seems to work well and the flag assembly heretofore described is in wide-spread general use. However, when it concerns two-wheeled vehicles powered by internal combustion engines, such as motorcycles and the like, which have as a component part thereof an integrated electrical system, the use of electrically illuminated safety and warning devices is more common, which thereby enables detection of the vehicles by other operators during the hours of darkness and inclement weather as well as at times when the vehicle may be clearly visible but not otherwise seen.

An example of a safety signal light assembly is disclosed in U.S. Pat. No. 3,345,506 dated Oct. 3, 1967 to Hautzenroeder, wherein a pair of complementary geometrically shaped lamp lenses of different color are secured together in a back-to-back abuttable relationship, and by means of a suitable mounting bracket member, said light is affixable to an appropriate location upon a tractor or like vehicle to provide flashing amber and red warning signals in opposite directions.

The disclosure shown in U.S. Pat. No. 2,704,839 to Sweet, dated Mar. 22, 1955, teaches a safety signal light assembly affixable to an automobile radio antenna and adjustable to an elevated position thereon so that the presence of the vehicle, by means of the elevated signal light, may be detected by operators of other vehicles more than one automobile to the rear of the subject vehicle. A disclosure similar to that of Sweet is shown in U.S. Pat. No. 3,487,360 to Thompson, dated Dec. 30, 1969, wherein an elevated signal light for an automobile is positioned above the roof level of the vehicle by means of attaching said light to the upper end of a retractible upright pole.

A series of illuminated safety light disclosures teaching attachment of a bi-colored safety light assembly to the outward end of a laterally extending support rod member connected to the handlebar of a bicycle, motorcycle, motor scooter or the like are taught in French Pat. No. 730,862 to Save, dated May 23, 1932, French Pat. No. 1,111,657 to Grangier, dated Nov. 2, 1955, and French Pat. No. 1,342,909 to Lafitte, dated Oct. 7, 1963, all of which were designed with the object in mind of providing illuminated safety light and signaling devices which would facilitate the detection of the presence of two-wheeled vehicles by operators of larger vehicles during the hours of darkness, during conditions of poor visibility, or in congested or obstructive vehicular traffic situations.

However, the disclosure most pertinent to the instant invention is that shown in U.S. Pat. No. 3,696,334 to Demeter, dated Oct. 3, 1972, wherein an elevated vehicle warning lamp device is affixed to a motorcycle frame or body member thereof rearward of the seat of said motorcycle. Although, in the aforementioned regard, Demeter's disclosure is similar to the instant invention, in that both inventions relate to elevated motorcycle mountable safety light assemblies, the instant invention is distinguishable over Demeter in that the instant invention discloses a motorcycle indicating safety light assembly, whereas Demeter's patent discloses a vehicle warning lamp device which happens to be particularly suitable for use on motorcycles, but a patentable distinction between the two exists which will become more readily apparent from the descriptions, and disclosures hereinafter set forth. Further, the instant invention is distinguishable from other earlier inventions discussed above in one or more ways in that the instant invention has utility features and new and useful advantages and and improvements not heretofore disclosed.

SUMMARY OF THE INVENTION

It is the principal object of the present invention to provide an indicating safety light assembly adapted to be affixed by clamp means to a generally horizontal frame member of an engine-powered two-wheeled vehicle such as a motor scooter, motorcycle, or the like, which indicating safety light assembly is mounted rearward of the seat of said vehicle and is comprised of the cooperating combination of a safety light assembly housing having a base support or mounting member to which is attached a pair of respective equal sized elongated vertically disposed cup-shaped illumination transmitting lens members, one of which lens members transmits an amber color and the other lens member of which transmits a red color from respective illuminating light sources, said lens members being affixed in a back-to-back relationship to each other upon said base or mounting member which forms an elongated block-like illuminating light and lens support means. Said safety light assembly housing is connected to the upper end section of a vertically extending support rod threadably inserted into a compressive clamp mounting member of the indicating safety light assembly combination, whereby said transmitting lens members are vertically disposed upon said support rod at an extended elevation nominally above the uppermost level of the vertical extremity of the vehicle upon which said indicating safety light assembly is attached, with the cupshaped amber lens member of said assembly facing the forward direction of said vehicle and the similarly shaped red lens member of said assembly facing the rearward direction of said vehicle so that operators of other oncoming or overtaking motor vehicles may easily and readily visually detect and identify the presence of a motor scooter, motorcycle, or similar such machine and identify the vehicle being approached or overtaken as a two-wheeled type as a consequence of detecting and recognizing the distinctively shaped elevated light of appropriate color, depending upon the direction of approach of the other vehicle operator to the two-wheeled vehicle equipped with said indicating safety light assembly.

It is a further object of the present invention to provide a two-wheeled engine-powered vehicle indicating safety light assembly which is electrically connected to said vehicle ignition switch so that indicating safety light assembly will be automatically illuminated upon starting of said vehicle engine and continue to be illuminated as long as the engine is running.

It is another object of the present invention to provide an indicating safety light assembly, and modified embodiments thereof, the principles of which are susceptible of being adopted as a national standard for two-wheeled engine-powered vehicle identification purposes as herein set forth.

It is still a further object of the present invention to provide a two-wheeled engine-powered vehicle indicating safety light assembly which is simple in design and has a sturdy construction, is economical to manufacture, and may be easily installed by a person possessed of average mechanical skill with standard tools.

DETAILED DESCRIPTION OF THE INVENTION

Figure 1:
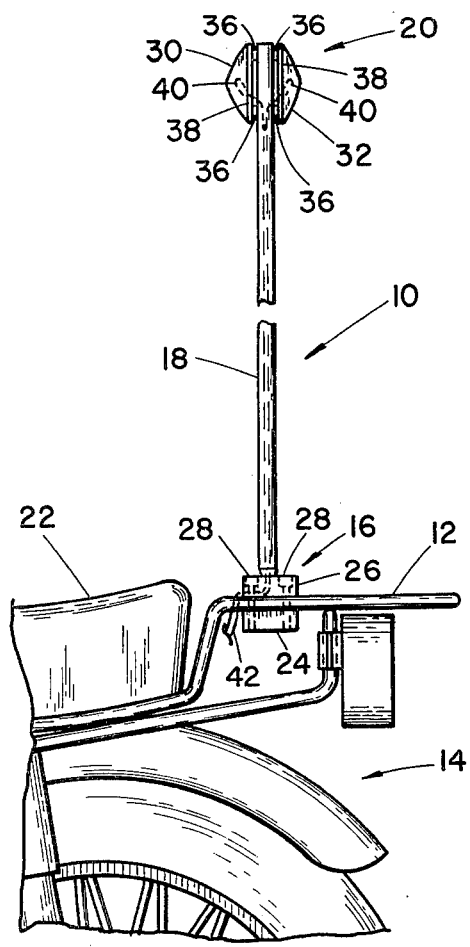
FIG. 1 is a fragmentary side elevation of an exemplary upper rear motorcycle frame section, showing installed on the luggage rack thereof one embodiment of an indicating safety light assembly which incorporates one embodiment of the principles of the present invention, with the vertically extending support rod member of said safety light assembly being foreshortened in order to accommodate the view to the sheet.

Referring to FIG. 1, a two-wheeled vehicle indicating safety light assembly 10 is shown installed upon the luggage rack member 12 of an exemplary upper rear motorcycle frame section 14, said indicating safety light assembly being generally comprised of a clamp-type base mounting member 16 into which is threadably inserted at the lower end thereof a vertically extending support rod member 18 to which is affixed at the uppermost end thereof a safety light assembly housing 20. This invention, as generally heretofore described, contemplates providing an illumination means whereby operators of other motor vehicles, whether in an oncoming or overtaking relation to a two-wheeled vehicle equipped with said indicating safety light assembly, can visually detect and reasonably determine their relative position to a two-wheeled vehicle and its operator, whether or not the operator of the oncoming or overtaking motor vehicle actually visually sees the two-wheeled vehicle and its operator. Also, a two-wheeled vehicle equipped with said indicating safety light assembly, upon approach of another motor vehicle from the rear, would likewise be recognized and identified by the operator of the other motor vehicle by means of visually detecting the upwardly extending illuminated indicating safety light assembly, whether in daylight or night hours. The vertically disposed cup-shaped illumination transmitting lens means of said indicating safety light assembly 10, by virtue of their distinctive shape and position, as well as color, provides such a visual identification and recognition means for other motor vehicle operators as heretofore described, and as will hereinafter be more particularly set forth.

Referring again to FIG. 1, there is shown in detail an exemplary first embodiment of this invention, as well as the details of installing the same upon an upper rear horizontal frame section of a two-wheeled vehicle, such as the luggage rack member 12 of a motorcycle, in addition to the method by which said indicating safety light assembly is preferably employed. Said indicating safety light assembly 10, as shown in FIG. 1, is attached by clamping rearwardly of a motorcycle seat 22, to said luggage rack member 12 by means of the clamp-type mounting member 16, which is comprised of a lower clamping member 24 and an upper clamping member 26, both of which are held and retained in securely clamped attachment to said luggage rack member 12 by means of bolt members 28 inserted through openings in said upper clamping member 26, which openings are of a slightly larger diameter than the threaded shanks of said bolts 28, which thereafter engage threaded openings in said lower clamping member 24, and by such means of threadable engagement securely clamp said indicating safety light assembly 10 to said luggage rack member 12. The vertically extending support rod member 18 supports at the upper end thereof the safety light assembly housing 20 which is attached thereto by one embodiment of the invention. The lower end of rod member 18 is threadably inserted into a centrally positioned threaded opening in the top clamping member 26.

Said safety light assembly housing 20 which is affixed to the upper end of said support rod member 18, is generally comprised of a pair of respective, equal size, vertically elongated, cup-shaped illumination transmitting lens members. In relation to the opposite sides of the vehicle, the forward facing illumination transmitting lens member 30 thereof is amber in color, and the rearward facing illumination transmitting lens member 32 thereof is red in color. Each of said illumination transmitting lens members, as illustrated in FIG. 1, is clamped to said support rod member 18 by bolt members 34, not shown in FIG. 1, which engage pliable washer members 36 positioned between said support rod member 18 and the respective lens base mounting members 38 for illumination transmitting lens members 30 and 32. Each of the respective lens members 30 and 32 is illuminated by an incandescent bulb 40 connected by wire conduit means 42 to the ignition switch of the exemplary two-wheeled vehicle so as to be automatically illuminated upon starting the engine of said two-wheeled vehicle upon which said indicating safety light assembly is installed and continues to be illuminated as long as said engine runs.

It should be noted that the safety light housing 20 is positioned upon the uppermost end of said vertically extending support rod member 18 at an elevation nominally above the uppermost extremity of said two-wheeled vehicle and normally above the top of the head level of a six (6) foot high operator of said vehicle, thereby providing an unobstructed view of said safety light indicating assembly to other operators of both approaching and overtaking motor vehicles, as well as other motor vehicle operators being overtaken by a two-wheeled internal combustion powered vehicle such as a motor scooter, motorcycle, or the like, which is equipped with said indicating safety light assembly. The characteristic shape and vertically extended elevation of the illumination transmitting lens members of said assembly further provides another motor vehicle operator with the ability to detect and recognize his approach to, or his approach by, a two-wheeled vehicle, and the color of the upwardly extended illumination transmitting lens member which is seen by the operator of said another motor vehicle indicates to him the direction of approach to, or by, a two-wheeled internal combustion powered vehicle.

Said two-wheeled vehicle indicating safety light assembly 10 may be constructed of metal, ceremic, or plastic, or a combination thereof, or any other suitable materials.

Figure 2:
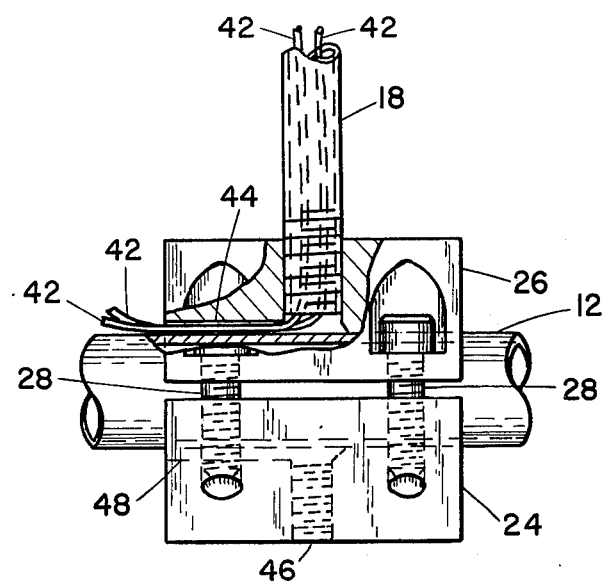
FIG. 2 is an enlarged partially sectioned side elevation of the clamp type mounting member of said indicating safety light assembly shown in FIG. 1 and illustrated as being installed upon a horizontal frame member of the motorcycle luggage rack as illustrated in FIG. 1.

The view seen in FIG. 2 is an enlarged partially sectioned side elevation of a first embodiment of clamp-type mounting member 16, showing in greater detail the mounting assembly as heretofore described, as well as the upper clamping member wire passage 44 in the upper clamping member 26, whereby the wire means 42 is admitted to the interior opening of the tubular support rod member 18 and extends therethrough for connection to the incandescent bulbs 40. In addition, said figure shows an alternate mounting opening 46 for the threaded lower end of vertical support rod member 18 in the lower clamping member 24, which may be employed in conjunction with the lower clamping member wire passage 48 for erecting said safety light housing 20 upon a smaller diameter tubular support rod member 18 if that should be desired.

Figure 3:
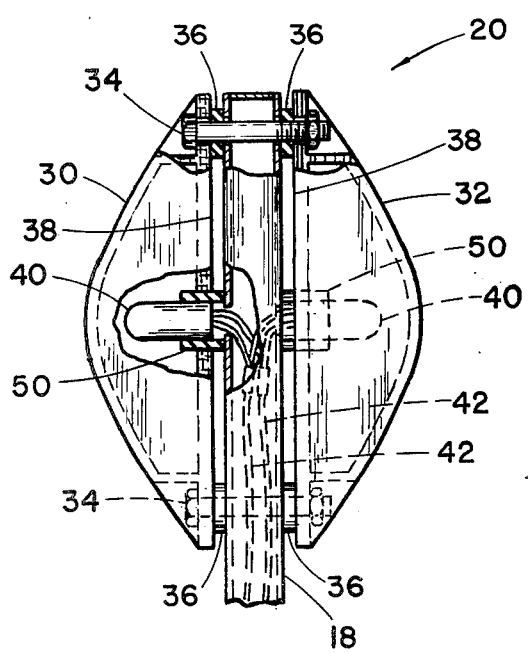
FIG. 3 is an enlarged partially sectioned side elevation of a safety light assembly housing comprised of a pair of elongated vertically disposed cup-shaped amber and red illumination transmitting lens members with the base mounting means thereof connectably affixed by bolt members to the upper end of said vertically extending rod member, the upper end of which rod member forms an elongated block-like safety light assembly housing support means.
Figure 4:
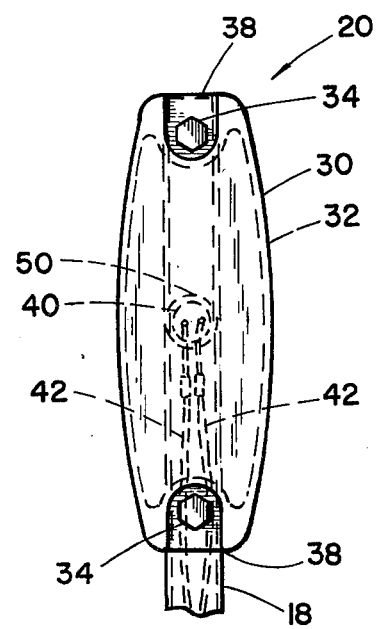
FIG. 4 is an end view of the enlarged side elevation of said safety light assembly housing as seen in FIG. 3.

The view seen in FIG. 3 is an enlarged, partially sectioned side elevation of said first embodiment of the safety light assembly housing 20 as generally shown in FIG. 1, but showing greater detail of construction thereof, as well as the bulb base mounting sockets 50 of the base mounting members 38, whereby the incandescent bulbs 40 are retained in position within the illumination transmitting lens members 30 and 32. In FIG. 4 there is shown an end view of the enlarged side elevation of said safety light assembly housing 20 shown in FIG. 3, and providing another perspective of said first embodiment of safety light assembly housing of the instant invention.

Figure 5:
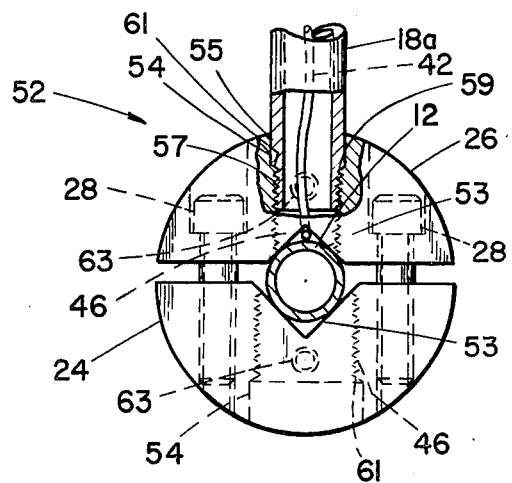
FIG. 5 is an enlarged end elevation of another embodiment of a modified clamp type mounting member for said indicating safety light assembly which is shown clamped upon a horizontal frame member of a motorcycle luggage rack such as illustrated in FIG. 1, said view being in fragmentary vertical section to show details.
Figure 6:
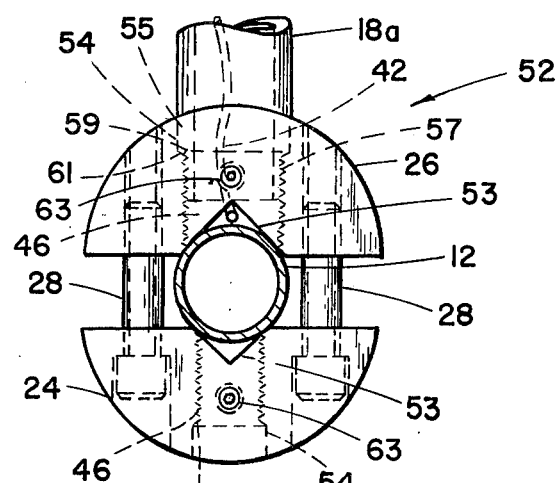
FIG. 6 is a view similar to FIG. 5, but showing instead said modified clamp type mounting member for said indicating safety light assembly invertedly installed by being clamped to a larger diameter horizontal frame member of the motorcycle luggage rack such as illustrated in FIG. 1, and showing also the same attachment to a larger diameter vertically extending support rod member than shown in FIG. 5.

Additional embodiments of the instant invention, comprising modified component elements of the indicating safety light assembly combination heretofore described, are illustrated in FIGS. 5–10 and are described as follows:

Respective enlarged end elevations of a modified clamp-type mounting member 52 are shown in FIGS. 5 and 6, and illustrate the employment of "V"-shaped slot means for purposes of being clamped to a frame section member of a two-wheeled vehicle, such as a luggage rack rod 12 thereof. It has generally been found that the diameter dimensions of rear frame section members of two-wheeled vehicles such as motorcycles and the like, which provide suitable mounting surfaces for a vehicle indicating safety light, range from about one-half to three-fourths inch, and by means of having different sized facing V-shaped slots 53 respectively in the upper and lower clamping members, as shown in FIGS. 5 and 6, there is provided means to clampingly engage either a smaller diameter or a larger diameter frame section member such as a luggage rack rod 12, which are respectively shown in FIGS. 5 and 6, and thereby permit installing said indicating safety light to either size of rod 12 as heretofore described.

Additional features illustrated in FIGS. 5 and 6 include the wire conduit 42 being admitted to the interior of a thick walled vertically extending tubular support rod 18a by being accommodated within the groove channel of the V-shaped slot in the upper clamping member, between said groove and the upper surface of the rod 12 to which said modified mounting member is clampably affixed. Additionally, it will be noted that the ability to incorporate the use of different diameters of thick walled vertically extending support rod members 18a, as respectively illustrated in FIGS. 5 and 6, is made possible by inverting the modified mounting member and threadably mounting a larger diameter thick walled vertical support rod member 18a to the alternate threaded mounting opening 46 therein. It should further be noted that both FIGS. 5 and 6 illustrate the incorporation, at the radial end of the threaded mounting openings 46 in the respective clamping members 24 and 26, of a smoothly reamed cylindrical wall of a seat 54 machined therein, which seat is of such a diameter that it provides a very close tolerance recess to enable a doweled fit relationship between the clamping member and a shoulder portion 55 of said rod, said shoulder portion being immediately above the reduced diameter threaded end 57 of said rod, which threaded and engages a threaded mounting opening 46 in clamping member 24 or 26.

Also to be noted is the fact that the reduced diameter threaded end 57 is of a shorter length than the depth of the threaded mounting opening 46, thereby enabling the seat-engaging end of the thick walled support rod 18a, which has an annular shoulder 59, to effect firm metal-to-metal engagement with the conplementary annular seat surface 61 of clamping member 24 or 26 upon threaded assembly of said support rod 18a with clamping member 24 or 26. There is additionally provided a set screw 63, which upon threadable assembly of said support rod 18a with clamping member 24 or 26, as heretofore described, is tightened to engage the reduced diameter threaded end 57 of said support rod 18a, and thereby secure the respective components of the aforementioned assembly in a locked relationship. All of which provides cooperating means for assembling and lockably retaining said thick walled vertically extending support rod member 18a in true and secure vertical alignment relative to clamping member 24 or 26 in a manner to resist fracture of the threaded end of the rod 18a relative to said clamping members.

Figure 7:
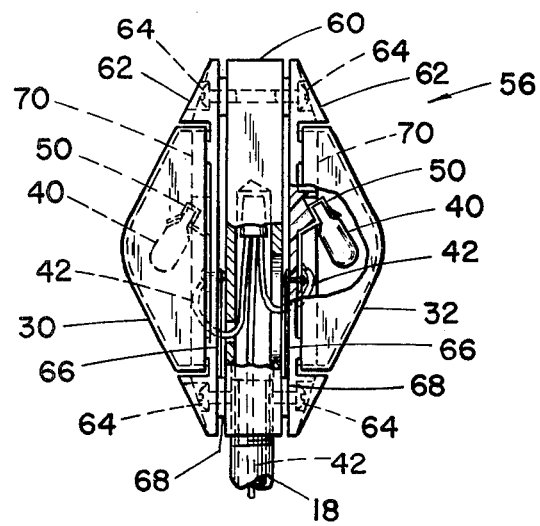
FIG. 7 is an enlarged partially sectioned side elevation of a modified safety light assembly housing with the base mounting means thereof threadably affixed to the upper end of said vertically extending support rod member.
Figure 8:
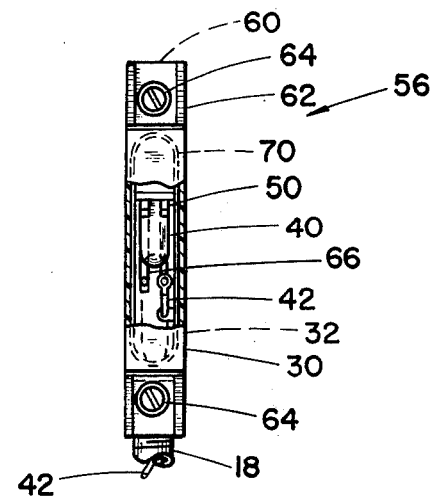
FIG. 8 is an end view of the enlarged side elevation of said modified safety light assembly housing as seen in FIG. 7.
Figure 9:
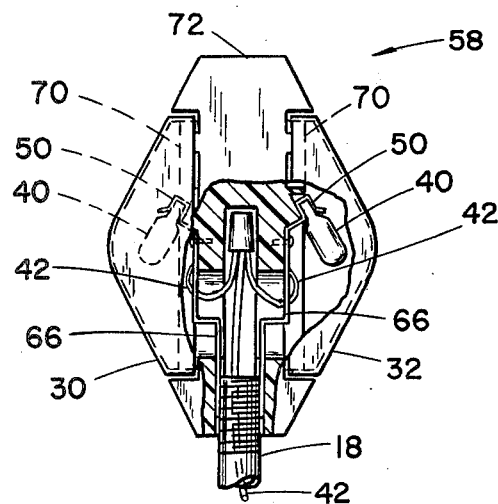
FIG. 9 is an enlarged partially sectioned side elevation of yet another embodiment of safety light assembly housing with the base mounting means thereof threadably affixed to the upper end of said vertically extending support rod member.
Figure 10:
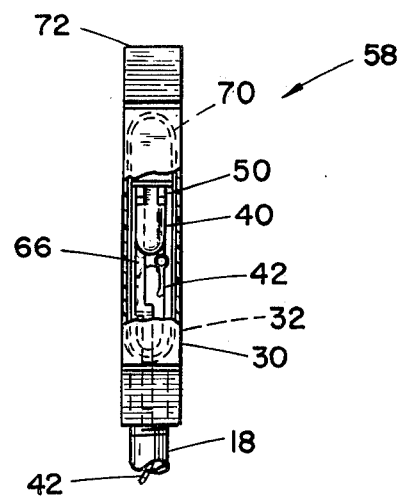
FIG. 10 is an end view of the enlarged side elevation of said embodiment of the safety light assembly housing shown in FIG. 9.

The views shown respectively in FIGS. 7 and 8, and FIGS. 9 and 10, illustrate modified constructions for the safety light assembly housing, wherein the views shown in FIGS. 7 and 8 respectively illustrate enlarged partially sectioned side and end views of a segmentalized safety light assembly housing 56, and the views respectively shown in FIGS. 9 and 10 illustrate enlarged partially sectioned side and end views of a unimodular safety light assembly housing construction 58.

The segmentalized safety light assembly housing construction 56 illustrated in FIGS. 7 and 8 embodies a design incorporating a block-like lens support member 60 threadably affixed in coaxial connection to the upper end of vertically extending support rod 18 or 18a. Lens base mounting members 62 are secured in vertically aligned, back-to-back abuttable relation upon said block-like lens support member 60 by means of screws 64. The advantageous feature obtained through the segmentalized housing construction 56, as respectively illustrated in FIGS. 7 and 8, is that of incorporating grounding contacts 66 from one of the respective terminals of each of the incandescent bulbs 40 which are electrically contacted with the two-wheeled vehicle frame structure to accomplish grounding through metal eyelets 68 which are in electrical circuit with said vehicle frame structure through the block-like lens support members, vertically extending support rod and modified clamp-type mounting member combination, thereby enabling the employment of only a single wire conductor 42 for current transmission connection with an ignition switch terminal of the vehicle upon which said indicating safety light assembly 10 is mounted. Thus, no conventional dual-wire conductor such as heretofore illustrated is necessary while at the same time retaining the automatic illumination feature of said indicating safety light assembly upon ignition of said vehicle motor. It should be noted that the respective lens members are frictionally affixed to their respective base mounting members 62 by means of compressive type clamping provided by an integrally formed mounting and retaining collar 70 for said lenses.

The views shown in FIGS. 9 and 10 illustrate a safety light assembly and housing 58 similar to the one previously illustrated in FIGS. 7 and 8, which is also threadably affixed in coaxial connection to the upper end of said vertically extending tubular support 18 or 18a. However, assembly and housing 58 has a block-like lamp and lens support member 72 of unimodular design and construction, formed integrally by molding or casting from a suitable dielectric material such as plastic or the like. The previously described grounding contact feature which permits the employment of a single wire conductor 42 is included by incorporating grounding contacts 66 which are firmly in direct engagement with the threads of the upper end of the vertically extending metallic tubular support rod 18 or 18a which provides grounding to the vehicle frame structure.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. An indicating safety light assembly comprising in combination, a clamp-type subassembly attaching means comprised of a pair of complementary members each having clamping surfaces opposing each other and provided in said surface centrally positioned V-shaped recesses wherein one of said recesses is larger than the other in cross-section thereby adapting said members to effectively receive and be clampably affixed to and firmly grip at least one of a plurality of different sized generally horizontal rod-like structural frame members of a motorcycle vehicle rearwardly of the front wheel base and handle bar said attaching means having at least one threaded socket radially provided in one of said complementary members thereof, a tubular rod threaded at one end into said socket and extending upwardly therefrom, said tubular rod being supported by said attaching means in vertically aligned position relative to said frame member, a geometrically shaped elongated block-like light subassembly threadably connected co-axially to the upper end of said tubular rod and having an opening to receive conductor means, said block-like light subassembly comprising a support base having opposite sides provided with socket means respectively receiving and supporting a pair of electric light bulbs, different colored elongated cup-shaped light-transmitting lenses, means removably connecting said lenses respectively to the opposite sides of said support base in back-to-back relation, an electric circuit conductor connectable at one end to a source of current on said vehicle and extending upwardly through said tubular rod and said opening in said block-like light subassembly for connection to contacts connected to said light bulb sockets and providing electrical current connection for said bulbs, and a circuit control means in said electric circuit.

2. An indicating safety light assembly according to claim 1, wherein each of said clamping members has a different sized threaded opening extending radially therein to respectively receive a complementary threaded end of tubular rods of different respective diameters.

3. An indicating safety light assembly according to claim 2, wherein each of the different sized threaded openings in said clamping members respectively have inwardly extending coaxial annular recessed seats of larger diameter than said different sized threaded openings but of less depth than said different sized threaded openings and respectively receiving with a tight fit complementary annular shoulders on said tubular rods which coaxially abutt said threaded ends of smaller diameter respectively integral with tubular rods of different respective diameters.

4. An indicating safety light assembly according to claim 3, wherein the threaded ends of smaller diameter on said tubular rods of different diameters are of a shorter length than the respective depths of the different sized threaded openings in said clamping members.

5. An indicating safety light assembly according to claim 2, wherein each of said clamping members has at least one threaded opening extending inward from one side face thereof and communicating with said radially extending threaded opening in said clamping members threadably receiving a set screw to lock said threaded end of said tubular rods in threaded engagement with said clamping members.

6. An indicating safety light assembly according to claim 1, wherein the upper end of said tubular rod forms an elongated mounting member having at least one transverse opening therethrough below the uppermost extremity thereof and further including bolt means communicating through said transverse opening of said elongated mounting member to affix thereto a pair of light assembly support base members having openings provided therein to receive said bolt means and thereby clamp said support base members in abutting engagement against said elongated mounting member.

7. An indicating safety light assembly according to claim 1, wherein said block-like light assembly comprises a rectangular shaped elongated block member having transversely disposed threaded openings respectively on opposite sides thereof, and further including a pair of light assembly support base members having holes through opposite ends thereof, and screw means extending through said holes and threadably engaging said threaded openings in said rectangular shaped elongated block member to secure said support base members to said rectangular shaped elongated block member.

* * * * *